Dec. 29, 1931.   W. O. EDDY   1,838,374
DEHYDRATOR HAVING VARIOUS INTERMITTENT VOLTAGES
Original Filed Feb. 7, 1927
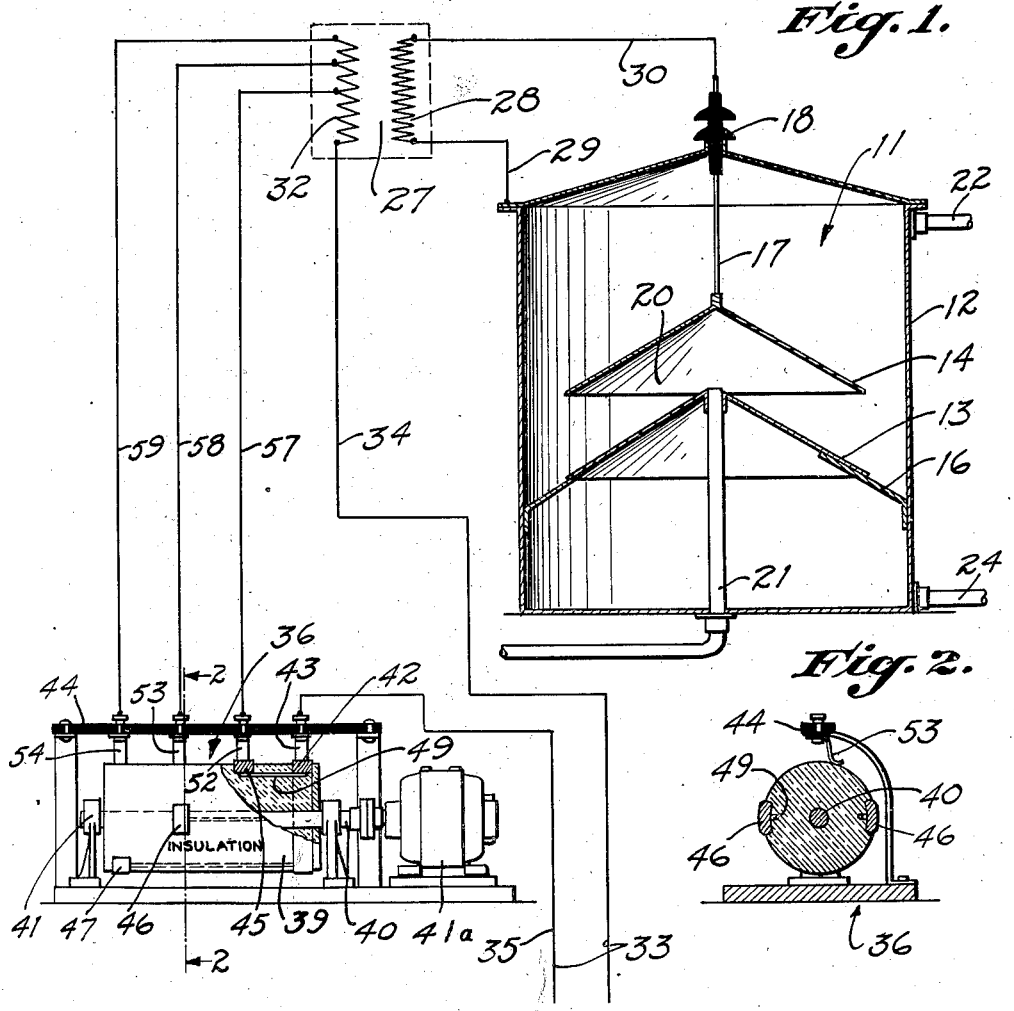
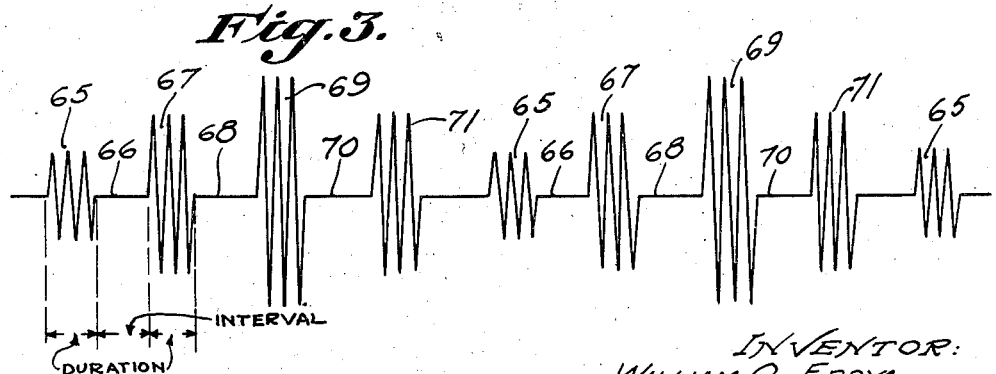
INVENTOR:
WILLIAM O. EDDY,
BY
ATTORNEY.

Patented Dec. 29, 1931

1,838,374

UNITED STATES PATENT OFFICE

WILLIAM O. EDDY, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

DEHYDRATOR HAVING VARIOUS INTERMITTENT VOLTAGES

Application filed February 7, 1927, Serial No. 166,461. Renewed October 22, 1930.

My invention relates to dehydrators, and particularly to an electrical dehydrating apparatus adapted for dehydrating petroleum emulsions having short-circuiting tendencies.

Petroleum often becomes associated with small water particles which will not separate therefrom by gravity and must be removed by a dehydrating process. Electrical dehydrating processes are used extensively for de-emulsifying oil and consist essentially in subjecting the emulsion to the action of an electric field. These processes are ordinarily conducted in an apparatus having a pair of electrodes immersed in the emulsion, and between which electrodes an electric field in established. The small particles of water carried by the oil are coalesced by the action of the electric field into masses of water of sufficient size to precipitate from the oil.

There is a certain class of emulsions which are of such a nature that, when an electric field is imposed thereon, a portion thereof forms short-circuiting paths through which electricity may flow from one electrode to the other, thus preventing a high voltage from being carried in the treating space between the electrodes. The ordinary commercial frequency sinusoidal alternating potential of the high voltage transformer is not effective in treating emulsions having short-circuiting tendencies because of the fact that a high voltage cannot be maintained in the treating space between the electrodes.

It is an object of this invention to provide a method and apparatus whereby emulsions having short-circuiting tendencies may be economically dehydrated.

In order to thoroughly dehydrate emulsion it is necessary to maintain a certain critical voltage in the treating space between the electrodes. I have found that this critical treating voltage varies with different emulsions. I have also found that part of the emulsion of a given batch may be broken down and satisfactorily separated at a low voltage, while a higher voltage is required to complete the treatment and dehydrate the other part of the emulsion. I have further discovered that the tendency to form short-circuiting paths is much less when the voltage is intermittently applied, giving the liquid a period of rest between the intervals of application of the voltage. Because of the fact that higher voltages show an increased tendency to short-circuit, it is difficult to maintain them at the desired high point.

It is an object of my invention to provide a process of utilizing the above-mentioned discoveries whereby voltages are applied to the emulsion under treatment for varying periods of time, the highest voltage being applied repeatedly for a comparatively short time only, and interspersed between the applications of high voltage various lower voltages are applied which have a short period of time. By this process I am able to utilize a high effective voltage of the treating field during a part of the time, whereas without utilizing this process it would be difficult to maintain the high voltage any of the time on such hard treating emulsions as require it.

Other objects and advantages of the invention will be made evident hereinafter.

Referring to the drawings in which I illustrate my invention,

Fig. 1 is a diagrammatic view illustrating an apparatus of the invention in which the method of the invention may be conducted.

Fig. 2 is a section taken on the line 2—2 of Fig. 1.

Fig. 3 is a diagram showing a wave form of the potential impressed on the field of the apparatus shown in Fig. 1.

Referring to the drawings in detail, and particularly to Fig. 1, 11 is a dehydrator having a tank 12 in which a grounded electrode 13 and a live electrode 14 are supported. The grounded electrode 13 is supported by brackets 16 which connect to the tank 12. The live electrode 14 is suspended by a rod 17 which extends downward from an insulator 18 supported by the top of the tank 12. Emulsion is supplied to a treating space 20 formed between the electrodes 13 and 14 by means of a pipe 21. Treated oil derived from the emulsion is withdrawn from the upper part of the tank 12 by means of an oil pipe 22 and water is withdrawn from the lower part of the tank 12 by means of a water pipe 24.

In Fig. 1 the numeral 27 represents a transformer having a secondary winding 28. The secondary winding 28 is connected to the grounded electrode 13 by means of a conductor 29 which connects to the tank 12, and is connected to the live electrode 14 by means of a conductor 30 which is connected to the upper end of the rod 17 which projects from the insulator 18. The transformer 27 also has a primary winding 32 which is energized by an electric circuit 33. A conductor 34 of the electric circuit 33 is connected directly to the primary winding 32 and a conductor 35 is extended to a current control device 36.

The current control device 36 includes a drum 39 which is formed from insulation material. The drum 39 is carried by a shaft 40 which is rotatably supported by bearings 41 and which is driven by means of a motor 41a. Supported by the drum 39 is an annular slip ring 42 which is adapted to be engaged by means of a finger contact 43 which is supported by an insulation cross bar 44. The conductor 35 of the electric circuit 33 is in electrical connection with the contact finger 43. Supported by the drum 39 is a low voltage moving contact 45, a pair of medium voltage moving contacts 46, and a high voltage moving contact 47. Each of the moving contacts 45, 46 and 47, is connected to the slip ring 42 by conductors 49 which are embedded in the drum 39. The insulation cross bar 44 carries a contact finger 52 which is adapted to engage the low voltage moving contact 45, a contact finger 53 which is adapted to engage the medium voltage moving contacts 46, and a contact finger 54 which is adapted to engage the high voltage moving contact 47. The moving contacts 45 to 47 inclusive are so arranged on the drum 39 that contact is made in the following sequence. The low voltage moving contact comes into engagement, one of the medium voltage moving contacts 46 comes into engagement, the high voltage moving contact 47 comes into engagement, and the other of the medium voltage moving contacts 46 comes into engagement. The contact finger 52 is connected to the central part of the primary winding 32 by means of a conductor 57, the contact finger 53 is connected to the primary winding 32 above the point where the conductor 57 connects to it by means of a conductor 58, and the contact 54 is connected to the end of the primary winding opposite the end to which the conductor 34 is connected, by means of a conductor 59.

The operation of the invention is as follows.

Emulsion is supplied to the treating space 20 by means of the emulsion pipe 21. The motor 41a is energized and the drum 39 is set into operation. When the contact 45 engages the contact finger 52, an electric field is impressed in the treating space 20. This electric field is of short duration since the contact 45 is quite short as compared to the circumference of the drum 39. The contact 45 is then disengaged from the contact finger 52 and a period of rest ensues. One of the contacts 46 then comes into engagement with the contact finger 53 and another electric field is set up in the treating space 20. In view of the fact that more of the primary winding 32 is included in the electric circuit 33 at this time, the voltage of this field will be smaller than the voltage of the first mentioned field. Contact is then broken between the contacts 46 and 53 and another period of rest follows. The contact 47 then comes into engagement with the contact finger 54 and another electric field is set up in the treating space 20. This electric field will be of a lower voltage than the other two electric fields because of the fact that the entire primary winding 32 is included in the electric circuit 33. Contact is then broken between the last mentioned contacts and a period of rest will follow, after which the other of the contacts 46 will come into engagement with the contact finger 53, at which time another electric field will be set up in the treating space 20. As the drum 39 continues to operate, electric fields of different potentials will be intermittently set up in the treating space 20.

In Fig. 3 I show the wave form of the electric fields set up in the treating space 20. Referring to this figure, a low voltage field 65 is set up when the primary 32 of the transformer is totally energized. Then there is an interval 66 of no voltage. An intermediate medium voltage field 67 is set up in the treating space and a no-voltage interval 68 will follow. After the interval 68 a high voltage field 69 will be impressed in the treating space 20, after which a no-voltage interval 70 will occur. After the no-voltage interval 70 is a medium voltage electric field 71. This completes a cycle of an operation of the invention.

In the first place it is important to note that in my invention the apparatus uses a commercial frequency current which is 50 to 60 cycles. The intervals of rest between the duration of treatment are greater than the durations of treatment, and I have found that longer periods of rest than those shown in Fig. 3 may be utilized when treating certain emulsions. The proportions of durations of treatment and intervals of rest may be varied to suit the emulsion being treated.

Adverting to the treatment which occurs in the treating space 20, the emulsion for which the invention is particularly adapted has short-circuiting tendencies and a continued high voltage current cannot be applied thereto without the electrodes being shorted. In my invention the electric field is established for a short period of time, this period of time being too short for the emulsion to line up and short-circuit. The high voltage fields 69 are sufficiently high and sufficiently long to have some breaking-down action on the emulsion. The continued application of the electric fields will very quickly and completely dehydrate the petroleum.

As previously pointed out, a portion of the emulsion may be broken down by a low voltage current. In my invention every fourth electric field is a low voltage electric field which acts on a portion of the emulsion and coalesces the water particles of this portion of the emulsion, leaving the remainder to be acted upon by the medium voltage fields 67 and 71 and the high voltage field 69. The low and medium voltage fields 65 and 67 are placed between the high voltage fields 69 so that the interval of time between the high fields is quite long.

In actual experience I have found that a continued intermittent application of successive high voltage fields will tend to chain up the emulsion if a sufficient period of time is not provided between each field. I utilize the time between the high voltage fields by impressing lower voltage fields on the emulsion during the interval between the high voltage fields.

Epitomizing the invention, the important features are as follows—the impressing of low frequency high voltage electric fields on an emulsion, and the intermittent impressing of electric fields of different voltages on an emulsion.

I claim as my invention:

1. A method of dehydrating emulsion comprising: subjecting said emulsion to the action of an electric field of high voltage; allowing said emulsion to rest; subjecting the emulsion to the action of an electric field of a lower voltage than said first-named field; and again allowing said emulsion to rest.

2. A method of dehydrating emulsion comprising: subjecting said emulsion to the action of a low frequency electric field of high voltage; allowing said emulsion to rest; subjecting the emulsion to the action of a low frequency electric field of a lower voltage than said first-named field; and again allowing said emulsion to rest.

3. A method of dehydrating emulsion comprising: subjecting said emulsion to the action of a low frequency electric field of high voltage; allowing said emulsion to rest for a longer interval of time than said electric field is impressed on said emulsion; subjecting the emulsion to the action of a low frequency electric field of a lower voltage than said first-named field; and again allowing said emulsion to rest.

4. A dehydrator for treating emulsions having: a pair of spaced electrodes; a transformer secondary winding connected to said pair of electrodes; a transformer primary winding; an electrical energy circuit; and means for connecting different parts of said primary winding in said circuit to vary the electric field between said pair of electrodes.

5. A dehydrator for treating emulsions having: a pair of spaced electrodes; a transformer secondary winding connected to said electrodes; a transformer primary winding; an electrical energy circuit; and means for intermittently connecting different parts of said primary winding in said circuit.

6. A method of dehydrating a petroleum emulsion which includes the steps of: subjecting the emulsion to the action of a high intensity alternating electric field, said field being of a high enough intensity to agglomerate one phase of the emulsion to form short-circuiting paths across the field if applied continuously; and removing said high intensity electric field after several alternations of said field, and before the agglomerated particles have time to line up in short-circuiting paths.

7. A method of dehydrating a petroleum emulsion which includes the steps of: subjecting the emulsion to the action of a high intensity electric field, said field being of a high enough intensity to agglomerate one phase of the emulsion to form short-circuiting paths across the field if applied continuously; removing said high intensity electric field after a very brief duration of time, and before the agglomerated particles have time to line up in short-circuiting paths; and subjecting the emulsion to the action of an electric field of lower intensity before again subjecting it to the action of said high intensity field.

8. A method of dehydrating a petroleum emulsion which comprises: passing the emulsion continuously through a treating space between a pair of electrodes; and successively and intermittently energizing said electrodes with high and lower potentials, with an intermediate potential between each high and lower potential.

9. In a dehydrator, the combination of: a pair of spaced electrodes defining a treating space; means for introducing an emulsion into said treating space; and means for intermittently supplying to said electrodes potentials of different magnitude.

10. In a dehydrator, the combination of: a pair of spaced electrodes defining a treating space; means for introducing an emulsion into said treating space; and electrically actuated means for intermittently energizing said electrodes with potentials of different magnitude.

11. A dehydrator comprising: a pair of spaced electrodes; a transformer providing high tension terminals electrically connected to said electrodes and setting up a high intensity electric field therebetween, said transformer including a tapped winding; an electrical energy circuit; switch means for connecting different taps of said tapped winding in said energy circuit thereby changing the potential between said high tension terminals; and electrically controlled means for actuating said switch means.

12. In an electric treater for breaking petroleum emulsions, the combination of: a pair of electrodes; means for supplying the emulsion to be treated to the space between said electrodes; a high voltage winding connected to said electrodes to set up an electric field therebetween; means including a tapped winding for changing the potential across said electrodes; and control means operatively connected to said last named means for actuating the same.

In testimony whereof, I have hereunto set my hand at Los Angeles, California, this 1st day of February, 1927.

WILLIAM O. EDDY.